(12) United States Patent
    Chen (10) Patent No.: US 11,853,481 B2
(45) Date of Patent: Dec. 26, 2023

(54) STYLUS AND TOUCH CONTROL SYSTEM

(71) Applicant: TCL Communications (Ningbo) Co., Ltd., Ningbo (CN)

(72) Inventor: Ping Chen, Ningbo (CN)

(73) Assignee: TCL Communication (Ningbo) Co., Ltd., Ningbo (CN)

( * ) Notice: Subject to any disclaimer, the term of this patent is extended or adjusted under 35 U.S.C. 154(b) by 337 days.

(21) Appl. No.: 17/283,574

(22) PCT Filed: Dec. 7, 2020

(86) PCT No.: PCT/CN2020/134318
§ 371 (c)(1),
(2) Date: Apr. 8, 2021

(87) PCT Pub. No.: WO2022/082947
PCT Pub. Date: Apr. 28, 2022

(65) Prior Publication Data
US 2022/0308677 A1    Sep. 29, 2022

(30) Foreign Application Priority Data
Oct. 22, 2020    (CN) .......................... 202011139331.5

(51) Int. Cl.
*G06F 3/03*    (2006.01)
*G06F 3/0354*    (2013.01)
(Continued)

(52) U.S. Cl.
CPC ............ *G06F 3/0308* (2013.01); *F21S 9/035* (2013.01); *F21V 23/0464* (2013.01);
(Continued)

(58) Field of Classification Search
CPC .......................... G06F 3/0308; G06F 3/03545
(Continued)

(56) References Cited

U.S. PATENT DOCUMENTS 9,285,903 B1    3/2016  Yun et al.
2003/0034962 A1    2/2003  Huang et al.
(Continued)

FOREIGN PATENT DOCUMENTS

CN    2509647    9/2002
CN    101963871    2/2011
(Continued)

OTHER PUBLICATIONS

International Search Report dated Jul. 27, 2021 From the International Searching Authority Re. Application No. PCT/CN2020/134318. (4 Pages).

(Continued)

*Primary Examiner* — Calvin C Ma (57) ABSTRACT

The disclosure comprises a stylus and a touch control system. The stylus comprises a pen body, a pen tip, and a light emitting device. The light emitting device is provided at the pen tip. A non-contacting end of the pen tip is connected to a bottom end of the pen body. The pen body is provided with a control module inside the pen body. The control module is electrically connected to the light emitting device and controls the light emitting device to emit light when a contacting end of the pen tip is applied to a reflective display.

18 Claims, 3 Drawing Sheets

(51) Int. Cl.
*F21S 9/03* (2006.01)
*F21V 23/04* (2006.01)
*F21Y 113/13* (2016.01)
*F21Y 115/10* (2016.01)

(52) U.S. Cl.
CPC ....... *G06F 3/03545* (2013.01); *F21Y 2113/13* (2016.08); *F21Y 2115/10* (2016.08)

(58) Field of Classification Search
USPC ......................................................... 345/179
See application file for complete search history.

(56) References Cited

U.S. PATENT DOCUMENTS

| | | | | |
|---|---|---|---|---|
| 2003/0128193 | A1* | 7/2003 | Huang | ................ G06F 3/03545 345/173 |
| 2011/0090702 | A1 | 4/2011 | Ho et al. | |
| 2014/0253468 | A1* | 9/2014 | Havilio | ............... G06F 3/03545 345/173 |
| 2018/0157347 | A1* | 6/2018 | Keidar | .................. H01L 31/053 |
| 2021/0232240 | A1* | 7/2021 | Smith | ................. G06F 3/04162 |

FOREIGN PATENT DOCUMENTS

| | | |
|---|---|---|
| CN | 201859401 | 6/2011 |
| CN | 102231088 | 11/2011 |
| CN | 202049451 | 11/2011 |

OTHER PUBLICATIONS

Notification of Office Action and Search Report dated Aug. 13, 2021 From the State Intellectual Property Office of the People's Republic of China Re. Application No. 202011139331.5. (7 Pages).

* cited by examiner

STYLUS AND TOUCH CONTROL SYSTEM

RELATED APPLICATIONS

This application is a National Phase of PCT Patent Application No. PCT/CN2020/134318 having International filing date of Dec. 7, 2020, which claims the benefit of priority of Chinese Patent Application No. 202011139331.5 filed on Oct. 22, 2020. The contents of the above applications are all incorporated by reference as if fully set forth herein in their entirety.

FIELD AND BACKGROUND OF THE INVENTION

The present invention relates to a field of electronics and light emitting diode (LED) technology, and in particular to a stylus and a touch control system.

Cell phones, tablets and other mobile terminals are commonly used in our daily life, and electronic devices are usually equipped with displays, including liquid crystal displays (LCD), reflective liquid crystal displays (RLCD), and Active Matrix/Organic Light Emitting Diode (AMOLED). The LCD, RLCD, and AMOLED need backlight or self-luminous light sources to provide light, and the blue ray carried by the light source will cause harm to human eyes. Therefore, display manufacturers have introduced a special display that does not require a backlight or self-luminous light: a reflective display. Light-emitting mechanism a reflective display includes a layer of reflective coating in the display that reflects external light to provide illuminance.

However, current electronic devices equipped with reflective displays cannot work in dark environments alone without additional light sources provided by users, and can only work properly in a bright place, causing great inconvenience to users who urgently need to use them in dark environments and degrading the user experience.

This application provides a stylus that can be used as a reflective light source for a reflective display in a dark environment, that improves the user experience, has a simple structure, and is featured with energy saving and environmental protection, as well as low production costs.

SUMMARY OF THE INVENTION

In a first aspect, an embodiment of the application provides a stylus comprising a pen body, a pen tip, and a light emitting device. The light emitting device is provided at the pen tip. A non-contacting end of the pen tip is connected to a bottom end of the pen body. The pen body is provided with a control module inside the pen body, and the control module is electrically connected to the light emitting device, and controls the light emitting device to provide light when a contacting end of the pen tip is applied to a reflective display.

In the stylus, the light emitting device comprises a plurality of LEDs, and the plurality of LEDs is provided in one or more rows around exterior of the pen tip.

In the stylus, material of the pen tip is transparent material, and the LEDs are provided in one or more rows around interior of the pen tip.

In the stylus, the stylus further comprises a light sensor. The light sensor is electrically connected to the control module. The light sensor detects ambient brightness. The control module further controls the light emitting device to emit light when the contacting end of the pen tip is operated on the reflective display and the light sensor detects that the ambient brightness is lower than a first preset threshold.

In the stylus, the stylus further comprises a pressure sensor. The pressure sensor is electrically connected to the control module, and senses pressure applied to the stylus. The control module further controls the light emitting device to emit light when the contacting end of the pen tip is applied to the reflective display and the pressure sensor senses that pressure applied to the stylus is greater than a second predetermined threshold.

In the stylus, the pen is further provided with a power supply battery inside the body of the pen. The control module is electrically connected to the power supply battery and the contacting end of the pen tip. The power supply battery supplies power to the control module. The control module further determines that the contacting end of the pen tip is operated on the reflective display upon receiving a contact sensing signal generated by the reflective display, and controls the light emitting device to emit light.

In the stylus, the pen body is a solar panel that charges a power supply battery.

In the stylus, the contacting end of the pen tip is made of conductive material, the conductive material of the contacting end is silicone.

In the stylus, the color temperature of the light emitting device comprises warm and cool colors. Light sources of the light emitting device includes monochrome and color. Types of the light sources of the light emitting device includes RGB and WRGB.

In the stylus, the reflective display comprises a reflective RLCD display and an ink display.

In a second aspect, an embodiment of the application provides a touch control system. The touch control system comprises a stylus and a reflective display. The stylus comprises a pen body, a pen tip, and a light emitting device. The light emitting device is provided at the pen tip. A non-contacting end of the pen tip is connected to a bottom end of the pen body. The pen body is provided with a control module inside the pen body, and the control module is electrically connected to the light emitting device, and controls the light emitting device to provide light when a contacting end of the pen tip is applied to the reflective display.

In the touch control system, the light emitting device comprises a plurality of LEDs, and the plurality of LEDs is provided in one or more rows around exterior of the pen tip.

In the touch control system, material of the pen tip is transparent material, and the LEDs are provided in one or more rows around interior of the pen tip.

In the touch control system, the stylus further comprises a light sensor. The light sensor is electrically connected to the control module. The light sensor detects ambient brightness. The control module further controls the light emitting device to emit light when the contacting end of the pen tip is operated on the reflective display and the light sensor detects that the ambient brightness is lower than a first preset threshold.

In the touch control system, the stylus further comprises a pressure sensor. The pressure sensor is electrically connected to the control module, and senses pressure applied to the stylus. The control module further controls the light emitting device to emit light when the contacting end of the pen tip is applied to the reflective display and the pressure sensor senses that pressure applied to the stylus is greater than a second predetermined threshold.

In the touch control system, the pen is further provided with a power supply battery inside the body of the pen. The control module is electrically connected to the power supply battery and the contacting end of the pen tip. The power supply battery supplies power to the control module. The control module further determines that the contacting end of the pen tip is operated on the reflective display upon receiving a contact sensing signal generated by the reflective display, and controls the light emitting device to emit light.

In the touch control system, the pen body is a solar panel that charges a power supply battery.

In the touch control system, the contacting end of the pen tip is made of conductive material, the conductive material of the contacting end is silicone.

In the touch control system, the color temperature of the light emitting device comprises warm and cool colors. Light sources of the light emitting device includes monochrome and color. Types of the light sources of the light emitting device includes RGB and WRGB.

In the touch control system, the reflective display comprises a reflective RLCD display and an ink display.

Useful Effects:

Compared to the prior art, the present application provides a stylus and a touch control system, the stylus comprising a pen body, a pen tip, and a light emitting device. The light emitting device is provided at the pen tip. A non-contacting end of the pen tip is connected to a bottom end of the pen body. The pen body is provided with a control module inside the pen body. The control module is electrically connected to the light emitting device. The control module is used to control the light emitting device when a contacting end of the pen tip is operated on the reflective display. The stylus provided by embodiments of the present invention is simple in design and process, low cost, and energy efficient and environmentally friendly, and can provide light source for reflective display in dark environment to improve user experience.

DESCRIPTION OF SPECIFIC EMBODIMENTS OF THE INVENTION

This application provides a stylus and touch control system. To make the purpose, technical solutions and effects of this application clearer and more definite, specific embodiments of the present application are described in further detail in the following in conjunction with the accompanying drawings and embodiments. The following embodiments are used to illustrate the invention, but are not intended to limit the scope of the invention.

Figure 1:
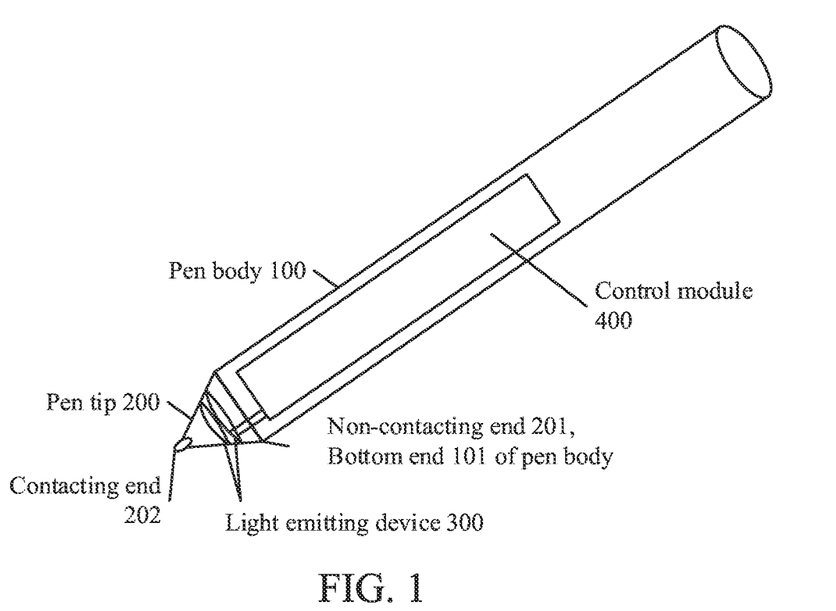
FIG. 1 is a schematic diagram of a structure of a stylus provided in the present application.

With reference to FIG. 1, the present application provides a stylus. The stylus comprises a pen body 100, a pen tip 200, and a light emitting device 300.

The light emitting device 300 is provided at the pen tip 200. A non-contacting end 201 of the pen tip is connected to a bottom end 101 of the pen body.

The pen body 100 is provided with a control module 400 inside the pen body 100. The control module 400 is electrically connected to the light emitting device 300. The control module 400 controls the light emitting device 300 to emit light when a contacting end 202 of the pen tip is applied to the reflective display.

In an embodiment, the light emitting device 300 is provided at the pen tip 200, and may be disposed inside or outside of pen tip 200 but is not limited hereto. The non-contacting end 201 of the pen tip is connected to the bottom end 101 of the pen body. The light emitting device 300 can emits light and provides a reflective light source for a reflective display in a poor light environment to enable a user to use the reflective display properly. The pen body 100 is provided with a control module 400 inside the pen body 100. The control module 400 is electrically connected to the light emitting device 300. The control module 400 controls the light emitting device 300 to emit light when the stylus is operated on the reflective display. When the user uses the stylus provided by embodiments of the present invention and uses the contacting end 202 of the stylus to contact with the reflective display, the stylus can receive a sensing signal sent by the reflective display, and can control the light emitting device 300 to emit light according to the sensing signal, so as to provide the reflective display with an emitting light source, thus enabling the user to operate the reflective display normally even when the surrounding environment is not bright enough.

For example, when a device equipped with a reflective display is used outdoors at night or in other places where the ambient brightness is not high, the ambient brightness is not sufficient to make the reflective display of the device work properly. Meanwhile, in response to contact operation of the contacting end 202 of the stylus provided by the present invention with the reflective screen, said stylus automatically emits light. The light source provided by the stylus can be used as a reflective light source of the reflective display, so that the device equipped with the reflective display can be used normally.

Additionally, in embodiments of the present invention, the reflective display includes, but is not limited to, a reflective RLCD or an ink display. Any display that requires a reflective light source for proper operation is within claims of the present invention.

As a preferred embodiment of the present invention, the light emitting device 300 comprises a plurality of light emitting diodes (LEDs) 301. The plurality of LEDs 301 is provided in one or more rows around exterior of the pen tip 200.

In an embodiment, the light emitting device 300 can be any device capable of emitting light. Specifically, because LEDs 301 is energy efficient, low price, and green, the embodiment of the present invention uses several LEDs 301 as the light emitting device 300. Preferably, by setting the LEDs 301 around exterior of the pen tip 200, not only is the design and process simple and low cost, but also utilization of light sources of the LEDs 301 is maximized to bring the light sources close to the reflective display, so that the reflective display can have enough light source to reflect for the user to browse clearer content and enhance the user experience.

Further, the pen tip 200 is made of transparent material. The LEDs 301 are provided in one or more rows around interior of the pen tip 200.

By setting the material of the pen tip 200 as transparent material and setting the several LEDs 301 around the interior of the pen tip 200, the present invention can not only improve aesthetics of the stylus, but also improve the safety of the stylus. Setting the LEDs 301 around the interior of the pen tip 200 can prevent the LEDs 301 from falling off and deterioration of appearance and functions of the stylus accordingly, and avoid the safety hazard caused by the user directly touching the LEDs 301.

Note that a number of LEDs 301 in the embodiment of the present invention can be set in one row or multiple rows around interior or exterior of the pen tip 200. The specific arrangement of LEDs 301 is not only limited to the way of setting around the inside and exterior of the pen tip 200, but can also be sparsely disposed, arranged, or scattered around the interior or exterior of the pen tip 200. In the embodiment of the present invention, the way of setting around is only an example of the arrangement, and any or a combination of the above mentioned ways of setting can be used in production of the stylus provided by the present invention, and these ways of setting are within the claims of the present invention.

Figure 2:
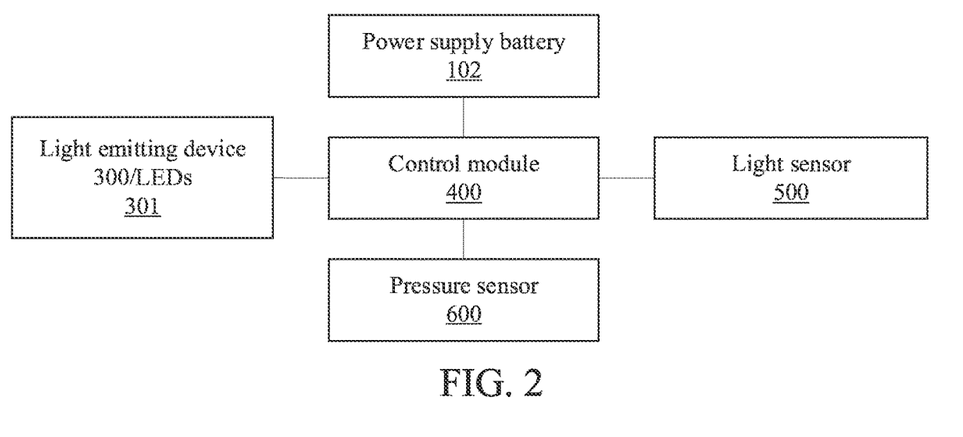
FIG. 2 is another schematic diagram of the structure of the stylus provided in this application.

With reference to FIG. 2, FIG. 2 is a schematic diagram of the structure of another embodiment of the stylus provided by an embodiment of the present invention. The stylus provided by an embodiment of the present invention further comprises a light sensor 500. The light sensor 500 is electrically connected to the control module 400. The light sensor 500 detects the ambient brightness. The control module 400 further controls the light emitting device 300 to emit light when the contacting end of the pen tip 202 acting on the reflective display and the light sensor 500 detects that the ambient brightness is lower than a first predetermined threshold.

The stylus further comprises the light sensor 500 electrically connected to the control module 400, enabling the control module 400 to receive signals generated by the light sensor 500, generate corresponding control instructions based on the signals, and control light emission of the light emitting device 300 according to the generated control instructions. Preferably, by pre-setting a threshold, the first preset threshold, in the light sensor 500, the present invention controls the light sensor 500 to generate a first signal when the light sensor 500 detects that the ambient brightness is lower than the first preset threshold, and sends the first signal to the control module 400 so that the control module 400 can control the light emitting device 300 to emit light according to the first signal.

Note that the user can change a value of the first preset threshold according to actual needs, so that the stylus can work only at the specified brightness. For example, user A is an outdoor worker and often uses a device equipped with a reflective display at night outdoors. When ambient brightness is low but not lower than the first preset threshold, the stylus does not emit light, and the user A cannot use the device equipped with a reflective display normally. The user A may tune up the first preset threshold to enable the stylus to work properly in that environment, thereby enabling the user to use the device equipped with a reflective display normally.

As a preferred embodiment of the present invention, in the embodiment of the present invention, a plurality of threshold parameters can also be set to control the light sensor 500 to generate different signals, so that the control module 400 can control the light emitting device 300 to emit light of different brightness according to the different signals, so as to not only reduce the power consumption of the stylus, but also to improve the user experience. For example, the user A pre-sets three different threshold parameters to control the light sensor 500 so that the light sensor 500 can generate three different signals. The three different signals can respectively enable the control module 400 to control the light emitting device 300, so that the light emitting device 300 can accordingly emit three different brightness levels of light, each brightness level of light requires different power consumption. In a brighter environment, a weak light source is provided to assist the reflective display. In a darker environment, a light source of mid brightness level is provided for partial reflection by the reflective display. In an environment with almost no light source, a brighter light source is provided for total reflection by the reflective display. The embodiment of the present invention is used to minimize the power consumption of the stylus.

Note that the user can configure one or more threshold parameters without restriction. The specific number of threshold parameters can be changed according to the actual needs of the user. By setting a plurality of different threshold parameters to control the light sensor 500 for generating a plurality of different signals, the control module 400 can control the light emitting device 300 of the stylus to emit light of different brightness, minimize power consumption of the stylus, save the user's usage cost, and improve user experience.

With reference to FIG. 2, the stylus provided by an embodiment of the present invention further comprises a pressure sensor 600. The pressure sensor 600 is electrically connected to the control module 400. The pressure sensor 600 senses pressure applied to the stylus. The control module 400 controls the light emitting device 300 to emit light controls when the contacting end 202 of the pen tip is operated on a reflective display and the pressure sensor 600 senses pressure applied to the stylus greater than a second predetermined threshold.

The stylus further comprises a pressure sensor 600 electrically connected to the control module 400. The pressure sensor 600 enables the control module 400 to receive signals generated by the pressure sensor 600, to generate corresponding control instructions based on the signals, and to control the light emission of the light emitting device 300 based on the generated control instructions. Preferably, pre-setting a threshold value, a second preset threshold value, in the pressure sensor 600, the present invention controls the pressure sensor 600 to generate a first signal when it senses that the pressure applied to the stylus is higher than the second preset threshold by, and send the first signal to the control module 400, so that the control module 400 can control the light emitting device 300 to emit light in accordance with the first signal.

Note that the user can change a value of the second preset threshold according to actual needs, so that the stylus can work only when sensing the specified pressure. For example, a user B need to use the stylus often whether in a well-lit or dim environment, then the second preset threshold is set to be greater than the pressure used by the user B as usual for using the stylus. As a consequence, the user B in a well-lit environment only need to use the stylus in accordance with normal habits. In a surrounding environment not bright enough to use the device equipped with a reflective display, the user B only needs to exert a little force on the stylus to trigger generation of the first signal by the pressure sensor 600 of the stylus, so that the control module 400 can control the light emitting device 300 of the stylus to emit light according to the first signal. Thus, the user B can use the device equipped with a reflective display under the conditions of insufficient ambient brightness.

As a preferred embodiment of the present invention, in the embodiment of the present invention, a plurality of threshold parameters can also be set to control the pressure sensor 600 in generating different signals, so that the control module 400 can control the light emitting device 300 to emit light of different brightness levels according to the different signals. Thus, not only power consumption of the stylus can be reduced, but also the user experience can be improved. For example, the user B preset three different threshold parameters to control the pressure sensor 600 in generating three different signals. The three different signals can respectively enable the control module 400 to control the light emitting device 300 in emitting three different brightness levels of light. Each brightness level of light requires different power consumption. In a brighter environment, a weak light source can be provided to assist reflective display. In a darker environment, a light source of a mid-brightness level is provided for partial reflection by the reflective display. In an environment with almost no light source, a brighter light source is provided for total reflection by the reflective display. The embodiment provided by the present invention is used to minimize the power consumption of the stylus.

Note that the user can configure one or more threshold parameters without restriction. The specific number of threshold parameters set can be changed according to the actual needs of the user. By setting a plurality of different threshold parameters to control the pressure sensor 600 in generating a plurality of different signals, the control module 400 can control the light emitting device 300 of the stylus to emit light of different brightness, minimize power consumption of the stylus, save the user's usage cost, and improve user experience.

With reference to FIGS. 1 and 2, the pen body 100 of the stylus provided by embodiments of the present invention is further provided with a power supply battery 102 inside. The control module 400 is electrically connected to the power supply battery 102, and the contacting end 202 of the pen tip, respectively. The power supply battery 102 supplies power to the control module 400. The control module 400 further controls the light emitting device 300 to emit light upon receiving sensing signals generated by the reflective display due to contact with the contacting end 202 of the pen tip.

In one embodiment, by providing a power supply battery 102 inside the pen body 100 of the stylus and electrically connecting the control module 400 to the power supply battery 102 and the contacting end 202 of the pen tip, respectively, the control module 400 can receive sensing signals transmitted by the contacting end 202 of the pen tip from the reflective display when the stylus is in contact with the reflective display, and can control the light emitting device 300 to emit light according to the sensing signals. Thus, the stylus only emits light when the stylus is in contact with the reflective display, and is prevented from emitting light in any operation other than contacting the reflective display, which prevents unnecessary power consumption of the stylus, saves cost for the user, and improves the user experience.

For example, a user C uses the stylus provided by the present invention to make contact with the reflective display. The stylus triggers the light emitting device 300 to emit light in response to the contact operation with the reflective display. The user C can use the light source provided by the light emitting device 300 of the stylus as the reflective light source of the reflective display, and browse the contents of the reflective display normally. When user C does not need to use the stylus anymore and places the stylus aside at will, another users D may use the stylus out of attention of the user C. The user D may play with the stylus and use the stylus to write in various places arbitrarily. Meanwhile, the stylus does not control the light emitting device 300 to emit light even if it touches other objects but does not receive the sensing signals sent by the reflective display. The power consumption of the stylus is thus greatly reduced.

Note that the power supply battery 102 may be a removable battery or a non-removable battery. Regardless of the type of battery used, the stylus of the present invention is capable of performing the operations of each of the above embodiments.

In another embodiment, the pen body 100 comprises a solar panel. The solar panel is used to charge the power supply battery 102.

By setting the pen body 100 of the stylus as a solar panel, the solar panel can charge the power supply battery 102 provided by the present invention, so that the user does not need to replace the power supply battery 102, which can make the stylus provided by the present invention more green, and further reduce the cost of the user.

Further, the contacting end 202 of the pen tip is made of a conductive material. The conductive material of the contacting end may be silicone.

To obtain the sensing signals sent by the reflective display, the contacting end 202 of the pen tip of the stylus of the embodiment of the present invention is made from conductive material. To facilitate the user's writing and improve the user's experience, the embodiment of the present invention also sets silicone as the contacting end 202 of the pen tip, which is not only green but also can well protect the reflective display from wear and tear.

Additionally, in this embodiment of the invention, color temperature of the light emitting device 300 includes warm and cool colors. The light sources of the light emitting device 300 includes monochrome and color. Types of the light sources of the light emitting device 300 includes RGB and white red green blue (WRGB).

By setting different color temperature, light sources, and light source types, different styli can be provided according to different users' requirements, thus meeting their needs and thus improving their experience.

In another embodiment of the present invention, the light emitting device 300 of the stylus may comprise LEDs 301 with different color temperatures, different light sources, and different light source types. According to the user's preference, different LEDs 301 may be set to meet the user's needs.

Further, the stylus also includes a light selection button. The light selection button is provided to the user for selection of different color temperature, different light sources, and different light source types of LEDs 301, to meet the needs of different users, and further enhance the user experience.

Note that the stylus provided in any of the above embodiments may be a capacitive stylus, and may be either an active capacitive stylus or a passive capacitive stylus. In particular, in the case of an active capacitive pen, a transmitting signal may be sent to the reflective display via the control module when the contacting end of the pen tip of the active capacitive stylus is in contact with the reflective display, for the reflective display to detect, based on the transmitting signal, a contact position of the pen tip of the active capacitive stylus on the reflective display. In the case of a passive capacitive pen, the pen body may be electrically connected to the control module so that when the contacting end of the pen tip of the passive capacitive stylus is in contact with the reflective display, an electrical signal from the reflective display can be transmitted to the user through the contacting end of the pen tip of the passive capacitive stylus, thereby enabling the reflective display to determine a contact position of the pen tip of the passive capacitive stylus on the reflective display.

Figure 3:
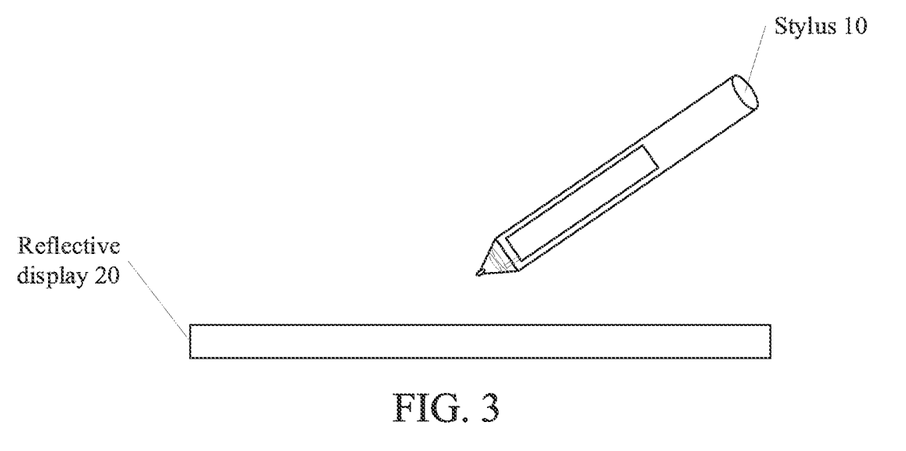
FIG. 3 is a schematic diagram of the structure of the touch control system provided in this application.

As a preferred embodiment of the present invention, with reference to FIG. 3, embodiments of the present invention also provide a touch control system comprising a stylus 10 as described in any of the above embodiments, and a reflective display 20. In particular, the stylus 10 in the system, when acting on the reflective display 20, is capable of controlling its light emitting device to emit light, thereby increasing reflective light sources for the reflective display 20 in the system.

In summary, embodiments of the present invention provide a stylus and a touch control system. The stylus comprising a pen body, a pen tip, and a light emitting device. The light emitting device is provided at the pen tip. A non-contacting end of the pen tip is connected to a bottom end of the pen body. The pen body is provided with a control module inside. The control module is electrically connected to the light emitting device. The control module is used to control the light emitting device when a contacting end of the pen tip is operated on the reflective display.

Embodiments of the present invention have the following beneficial effects:

1. simple design and process that reduce production costs;
2. providing power to the power supply battery through the solar panel, which makes the stylus energy-saving and environmental friendly; and
3. through the provision of light emitting devices, the stylus can provide a light source for the reflective display in a dark environment, and improve user experience.

It is understood that a person with ordinary skills in the art can do modification or improvement without departing from the technical solutions and principles of this application. Therefore, such modification or improvement should be included in the claims accompanying the application.

What is claimed is:

1. A stylus, wherein the stylus comprises:
   a pen body;
   a pen tip; and
   a light emitting device;
   the light emitting device is provided at the pen tip, a non-contacting end of the pen tip is connected to a bottom end of the pen body;
   the pen body is provided with a control module inside the pen body, and the control module is electrically connected to the light emitting device, and controls the light emitting device to provide light when a contacting end of the pen tip is applied to a reflective display,
   wherein the stylus further comprises a pressure sensor;
   the pressure sensor is electrically connected to the control module, and senses pressure applied to the stylus; and
   the control module further controls the light emitting device to emit light when the contacting end of the pen tip is applied to the reflective display and the pressure sensor senses that pressure applied to the stylus is greater than a second predetermined threshold.

2. The stylus according to claim 1, wherein the light emitting device comprises a plurality of LEDs, and the plurality of LEDs is provided in one or more rows around exterior of the pen tip.

3. The stylus according to claim 2, wherein material of the pen tip is transparent material, and the LEDs are provided in one or more rows around interior of the pen tip.

4. The stylus according to claim 1, wherein the stylus further comprises a light sensor;
   the light sensor is electrically connected to the control module, the light sensor detects ambient brightness; and
   the control module further controls the light emitting device to emit light when the contacting end of the pen tip is operated on the reflective display and the light sensor detects that the ambient brightness is lower than a first preset threshold.

5. The stylus according to claim 1, wherein the pen is further provided with a power supply battery inside the body of the pen;
   the control module is electrically connected to the power supply battery and the contacting end of the pen tip;
   the power supply battery supplies power to the control module; and
   the control module further determines that the contacting end of the pen tip is operated on the reflective display upon receiving a contact sensing signal generated by the reflective display, and controls the light emitting device to emit light.

6. The stylus according to claim 5, wherein the pen body is a solar panel that charges a power supply battery.

7. The stylus according to claim 5, wherein the contacting end of the pen tip is made of conductive material, the conductive material of the contacting end is silicone.

8. The stylus according to claim 1, wherein the color temperature of the light emitting device comprises warm and cool colors;
   light sources of the light emitting device comprise monochrome and color; and
   types of the light sources of the light emitting device includes RGB and WRGB.

9. The stylus according to claim 1, wherein the reflective display comprises a reflective RLCD display and an ink display.

10. A touch control system, wherein the touch control system comprises:
    a stylus; and
    a reflective display;
    wherein the stylus comprises a pen body, a pen tip, and a light emitting device;
    the light emitting device is provided at the pen tip, a non-contacting end of the pen tip is connected to a bottom end of the pen body;
    the pen body is provided with a control module inside the pen body, and the control module is electrically connected to the light emitting device, and controls the light emitting device to provide light when a contacting end of the pen tip is applied to the reflective display,
    wherein the stylus further comprises a pressure sensor;
    the pressure sensor is electrically connected to the control module, and senses pressure applied to the stylus; and
    the control module further controls the light emitting device to emit light when the contacting end of the pen tip is operated on the reflective display and the pressure sensor senses that the pressure applied to the stylus is greater than a second predetermined threshold.

11. The touch control system according to claim 10, wherein the light emitting device comprises a plurality of LEDs, the plurality of LEDs is provided in one or more rows around exterior of the pen tip.

12. The touch control system according to claim 10, wherein material of the pen tip is transparent material; and
    the LEDs are provided in one or more rows around interior of the pen tip.

13. The touch control system according to claim 10, wherein the stylus further comprises a light sensor;

the light sensor is electrically connected to the control module, and detects ambient brightness; and the control module further controls the light emitting device to emit light when the contacting end of the pen tip is operated on the reflective display and the light sensor detects that the ambient brightness is lower than a first predetermined threshold.

14. The touch control system according to claim 10, wherein the pen body is further provided with a power supply battery inside;

the control module is electrically connected to the power supply battery and the contacting end of the pen body;

the power supply battery supplies power to the control module;

the control module further determines that the contacting end of the pen tip is operated on the reflective display upon receiving a contact sensing signal generated by the reflective display, and controls the light emitting device to emit light.

15. The touch control system according to claim 14, wherein the pen body is a solar panel and the solar panel is used to charge the power supply battery.

16. The touch control system according to claim 14, wherein the contacting end of the pen tip is made of a conductive material, the conductive material of the contacting end is silicone.

17. The touch control system according to claim 10, wherein color temperature of the light emitting device comprises warm and cool colors;

light sources of the light emitting device comprise monochrome and color; and types of the light sources of the light emitting device includes RGB and WRGB.

18. The touch control system according to claim 10, wherein the reflective display comprises a reflective RLCD display and an ink display.

* * * * *